(12) United States Patent
Robertson

(10) Patent No.: US 6,289,639 B1
(45) Date of Patent: Sep. 18, 2001

(54) GROUND BARRIER TO STYMIE DIGGING ANIMALS

(76) Inventor: Bonnie Kaye Davis Robertson, P.O. Box 1221, Centerville, TX (US) 75833-1221

( * ) Notice: Subject to any disclaimer, the term of this patent is extended or adjusted under 35 U.S.C. 154(b) by 0 days.

(21) Appl. No.: 09/506,130

(22) Filed: Feb. 17, 2000

(51) Int. Cl.[7] .................................................. A01K 3/00
(52) U.S. Cl. ................................ 52/101; 47/84; 47/1.01
(58) Field of Search ................................................ 52/101

(56) References Cited

U.S. PATENT DOCUMENTS

| 5,451,239 | * | 9/1995 | Sewell et al. | 47/1.01 |
| 5,528,858 | * | 6/1996 | Omdahl | 47/84 |
| 6,044,594 | * | 4/2000 | Desselle | 52/101 |

* cited by examiner

*Primary Examiner*—Carl D. Friedman
*Assistant Examiner*—Steve Varner
(74) *Attorney, Agent, or Firm*—John R. Casperson

(57) ABSTRACT

Animals can be prevented from digging in an area by positioning a plastic mesh barrier on the surface of the earth where it is desired to prevent the digging. The mesh can be anchored so that it will remain reliably positioned and will become nearly invisible as vegetation grows through the openings of the mesh.

7 Claims, 3 Drawing Sheets

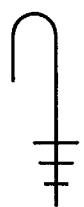
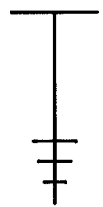
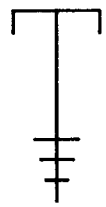
FIG. 8     FIG. 9     FIG. 10
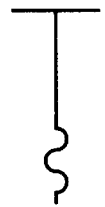
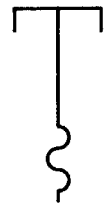
FIG. 11    FIG. 12    FIG. 13
FIG. 14    FIG. 15    FIG. 16
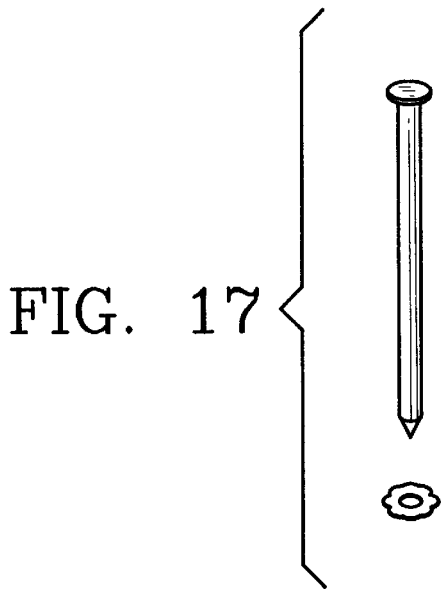
FIG. 17
FIG. 19
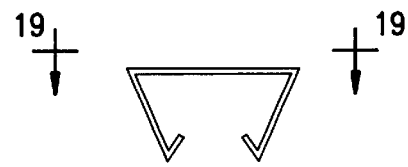
FIG. 18

GROUND BARRIER TO STYMIE DIGGING ANIMALS

BACKGROUND OF THE INVENTION

In one aspect, this invention relates to a ground barrier to stymie digging animals. In another aspect, this invention relates to a ground barrier system. In further aspect, this invention relates to a method to prevent animals from digging in undesired areas.

Animals dig for a number of reasons. For example, dogs dig when they are trying to catch varmints such as moles and gophers. They dig when they desire to escape from an enclosure. They dig to get at roots and herbs. They dig when they have something they want to bury. They dig when they want a cool place to lie in the summer, or a place more out of the wind in the winter. They also dig for entertainment when they are bored, or because they see other dogs digging.

Dog owners generally find the end results of all the digging to be undesirable. The dogs may escape their fenced areas and get into mischief with livestock or with other dogs or pets, or they may be injured or killed. Or they may simply disappear. In cities or towns, the escaped dogs are frequently captured by animal control, and the owner has to pay a fine to recover them. Where the owner is reluctant or unable to pay the fine, the animal may be destroyed. In fact, runaway dogs which have escaped their yards by digging under the fence or gate constitutes one of the largest categories of dogs in animal shelters, and such dogs which have not been claimed by their owners constitute one of the largest categories of dogs which are destroyed every year. In the country, and in the city as well, dogs which have escaped may form into packs and constitute a public nuisance.

Digging by animals in landscaped areas such as in planters, flowerbeds or gardens, or under building foundations can be extremely destructive, whether by dogs, armadillos, foxes or other digging animals. Digging by dogs also generates mud, which often finds its way into and on homes, outbuildings and clothing. Digging in a dog run is also undesirable, since it results in holes which may fill with water and provide a breeding ground for mosquitos and/or form cesspools which give rise to objectionable odors.

Dogs can be taught not to dig.

A first technique for teaching them not to dig relies on "catching them in the act" and applying a correction. For example, the dog can be jolted with an electric shock collar when they beginning to dig, or shot with a pea from a slingshot, or charged and yelled at and spanked. However, training a dog with this technique requires vigilance and consistency, and is thus seldom effective. Also, many dogs learn to avoid the correction simply by not digging while they are being watched.

A second technique relies on traumatizing the dog after the act in a way that causes the dog to associate the trauma with the digging. For example, dogs can be taught not to dig by filling each newly discovered hole with water and immersing the dog's heads under the water for a long enough period of time to be unpleasant to the dog. The process is repeated two days in a row for each newly discovered hole before the hole is filled in. Many dog owners find it too distasteful to repeat the process enough times for the dog to associate the drowning sensation with the digging. Dogs which do make the association may sometimes start fights with other dogs which they see digging holes. A related method along this line which may not be as distasteful is to drive a stake into each newly discovered hole and chain the dog closely to the stake for a period of time adequate to make an impression on the dog. The stake is left in the hole after the dog is released. After a while, the dog begins to associate being left tied on a short lead to the stake with the digging of the hole, and hopefully learns to avoid the digging.

Other methods rely on making unpleasant for the dog to begin to dig. For example, clipping the dogs toenails very short is said to be somewhat effective. Placing dog feces in the hole has been said to be effective. Seeding an area with mothballs or red pepper is also said by some to be effective.

It is also known to use ground barriers to prevent digging. For example, concrete is highly effective digging barrier However, a concrete slab is generally unattractive, and it would be cost prohibitive to cover a large area with concrete. It has been proposed to bury wire mesh alongside fences or in preferred digging areas to discourage the activity. However, fine wire, such as chicken wire, which is easy to bend and to position in a hole is something of an entanglement trap for the dog and it further deteriorates quickly when buried. Heavy wire such as chain link, hog wire, or cattle panel would be difficult to work into a hole and would constitutes a mowing hazard, besides being expensive. Iron-containing wire further would further deteriorate when buried to form a future hidden puncture (and infection) hazard to both dogs and humans in the area.

An effective ground barrier to prevent digging by dogs and other digging animals which is inexpensive, easy to install, and is safe for dogs and mowing operations would be very desirable.

SUMMARY OF THE INVENTION

In one embodiment of the invention, there is provided a method to prevent animals from digging. The method is carried out by positioning a plastic mesh barrier on the surface of the earth where it is desired to prevent the animals from digging and anchoring the plastic mesh barrier in the desired position.

As noted above, it is known to prevent dogs from digging by using a wire mesh. I have found, unexpectedly, that a plastic mesh is equally effective. The plastic is longer lived than fine wire. It is easier to conform the plastic mesh into the needed shape. The plastic mesh is much safer where the area will be subsequently mowed, especially where it is anchored with plastic stakes. The plastic mesh does not deteriorate to form a puncture hazard. The plastic mesh is available in aesthetically pleasing colors.

The invention can be marketed in feed stores, home improvement stores, garden centers and like in kit form. The kit is in the form of a roll of plastic polymer mesh and a plurality of fasteners for attaching the plastic polymer mesh flat against the earth. Preferably, simple instructions are also provided. The roll or polymer mesh need not be nearly as heavy as wire mesh adequate for the job and can be handled and applied by consumers having a wide range of physical strength.

In use, the invention provides a ground barrier system which prevents animals from digging. The ground barrier system is formed by a layer of plastic polymer mesh positioned in covering relationship with the area of earth in which it is desired to prevent the animals from digging and of a plurality of fasteners attaching the plastic polymer mesh to such area of earth.

BRIEF DESCRIPTION OF THE DRAWINGS

FIGS. 8–16 illustrate schematically various forms of fasteners which can be employed in the invention.

FIG. 17 illustrates an exploded view of one preferred fastener device for use in the invention.

FIG. 18 illustrates a side view of an alternative fastener which can be used in the invention.

FIG. 19 illustrates a top view of the fastener shown in FIG. 18 as viewed along lies 19—19.

DETAILED DESCRIPTION OF THE INVENTION

In one embodiment of the invention, there is provided a method to prevent animals from digging. The method is carried out by positioning a plastic mesh barrier on the surface of the earth where it is desired to prevent the animals from digging, and anchoring the plastic mesh barrier in the desired position.

Although many animals dig, it is expected that the invention will have its greatest utility when applied to prevent digging by domestic animals, such as dogs, and feral animals which are roughly the size of dogs such as rabbits, armadillos or foxes.

The method is advantageous when carried out to protect flower beds. By selecting a mesh size in about the 3-inch range, application of the mesh will not interfere with the growth of many types of flowering plants. For large or long-lived plants, holes can be cut into the mesh if desired. Generally speaking, a mesh size in the range of 0.5 to about 5 inches, usually in the range of 2–4 inches, is suitable for preventing digging in flowerbeds by animals such as dogs and armadillos.

Figure 1:
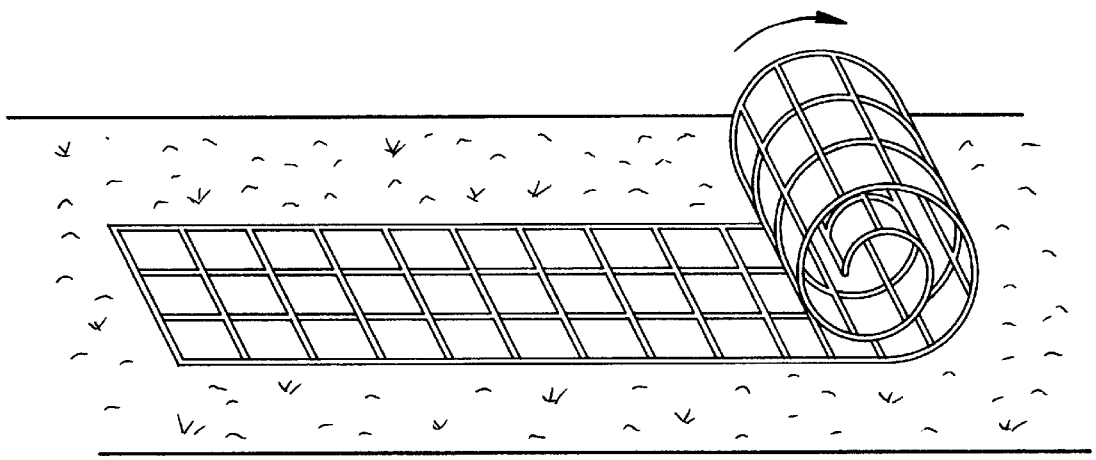
FIG. 1 is a pictorial representation showing applying one embodiment of the invention to the ground.
Figure 2:
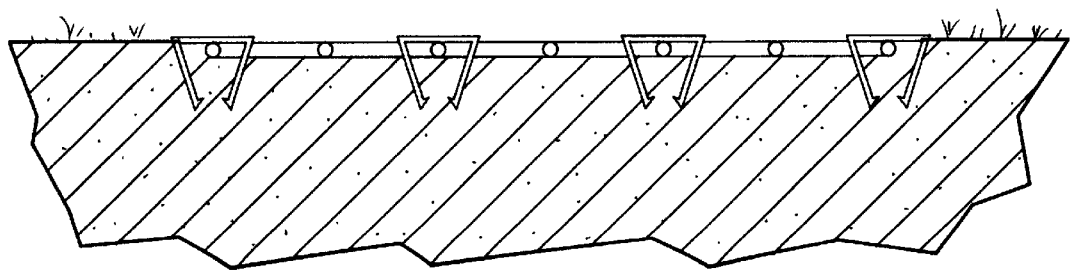
FIG. 2 is a cross sectional view showing one embodiment of the invention in use on the ground.
Figure 3:
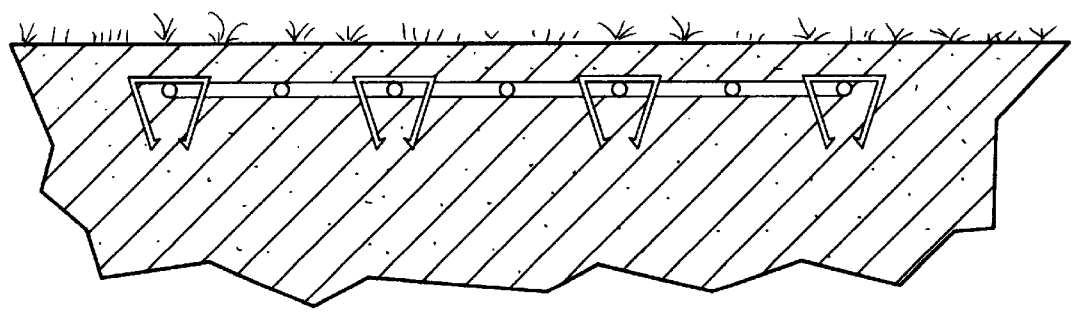
FIG. 3 is a cross sectional view showing another embodiment of the invention in use in the ground.

The invention is also advantageously carried out to protect a lawn. Where the mesh is supplied in a roll, it can be applied by unrolling it and anchoring it to the selected area. See FIG. 1. By selecting a mesh which is green or earth toned, or colorless, the mesh will be nearly invisible after it is applied. Grass will grow through the mesh and the lawn can be cut at a slightly higher than normal mower setting if desired for even better concealment. See FIG. 2. Or, the mesh can be buried, or laid down before the lawn is sodded. See FIG. 3. If the mesh is to be buried, a burial depth in the range of about 1 to about 10 inches will provide good results. However, a burial depth in the shallow end of this range is preferred, since it is more effective at preventing significant excavation and in teaching the dog that future digging is futile.

Dogs frequently dig along fence lines, so as to escape their enclosures. Rabbits will dig under a fence to enable them to ravage a garden contained within. Along fence lines is thus a particularly preferred area in which to apply the invention. One edge of a roll of mesh can be fastened to the fence if desired, such as by plastic ties, and the other edge can be anchored to the earth. The body of the mesh can be buried if desired, or vegetation, such as shrubbery can be permitted to grow through it.

Figure 4:
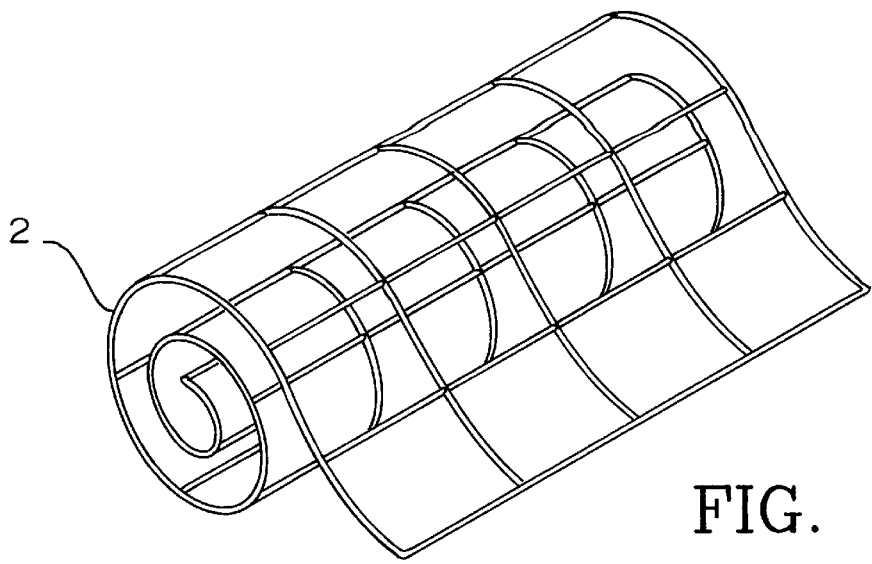
FIG. 4 is a pictorial representation of another embodiment of the invention.
Figure 7:
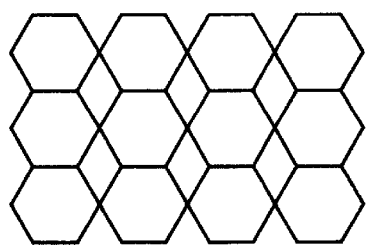
FIG. 7 is a plan view of another alternate embodiment of the invention of FIG. 5.
Figure 6:
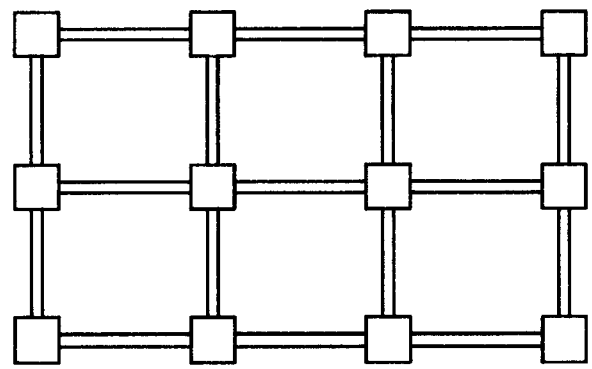
FIG. 6 is a plan view of an alternate embodiment of the invention of FIG. 5.
Figure 5:
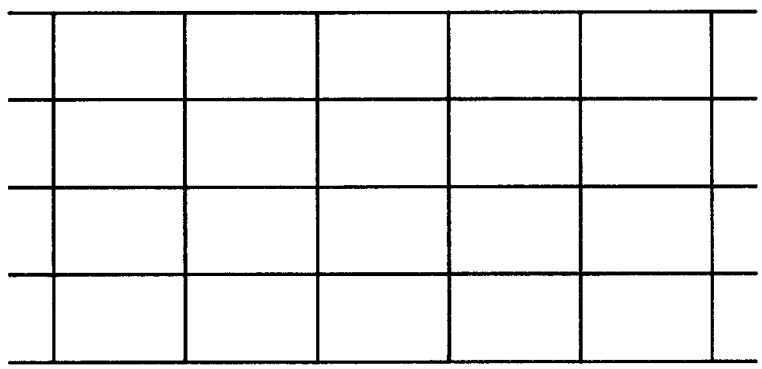
FIG. 5 is a plan view of a portion of the invention as shown in FIG. 4.

It is anticipated that the invention can be marketed in feed stores, home improvement stores, garden centers and like in kit form. The kit is in the form of a roll 2 of plastic polymer mesh (See FIG. 4) and a plurality of fasteners (FIGS. 8–18, for example) for attaching the plastic polymer mesh flat against the earth. Preferably, simple instructions are also provided.

The fasteners illustrated in FIGS. 8–16 can be constructed of a plastic polymer. When polymer is used, it is preferably of a tough thermoplastic material. Both the fasteners and the mesh can be constructed of the same material. Many materials are suitable. For example, the plastic polymer can be from the group consisting of polyethylene, polyethylene+higher alpha-olefin copolymer, polypropylene and polyvinylchloride. Generally speaking, each fastener has a lower end which is pointed for penetrating the earth and an upper end for catching a strand of the mesh. The shaft is generally in the range of from about 5 inches to about 15 inches in length and can be provided with threads, flutes, an auger blade, or barbs to facilitate firmly anchoring the mesh.

The fastener shown in FIG. 17 constitutes a nail, preferably an aluminum nail, with a washer, preferably a plastic washer, which is positioned on the nail shaft adjacent to the head and clips to a strand of the mesh. The fastener shown in FIGS. 18 and 19 is generally staple-shaped, with a pair of legs which are pressed into the earth and a back which straddles one or more of the strands of mesh and holds the mesh against the earth. This fastener is preferably formed of steel and the back is preferably flattened as shown in FIG. 19. The legs preferably have barbs at their lower end and lean toward each other. The width of the fastener back is preferably an integer multiple of the spacing between adjacent strands of the mesh.

The mesh illustrated in FIGS. 4–7 can have a wide range of configurations. Construction type fencing is highly suitable, except that high visibility colors are not preferred, albeit purely for aesthetic reasons. The most desirable colors are colorless, green, black and brown and the polymer preferably contains a coloring agent to impart such color, as well a UV stabilizers and other additives as are known.

A mesh size in the range of about 0.5 inches to about 5 inches is generally suitable and a mesh size of 2–4 inches is preferred. The layout of the mesh can be rectangular (See FIG. 5) or polygonal (See FIG. 7) or other. The mesh is preferably of a weight generally suitable for fencing, such as for construction fencing or safety fencing. Such materials are pliable enough to conform to gentle undulations in the earth but are heavy enough for the requisite durability. The mesh usually has a weight in the range of 1/50th to 1/2 pound per square foot, usually in the range of 1/20th to 1/5 pound per square foot, and is constructed of thermoplastic polymer having a yield strength in the range of 1000 to 5000 psi and an elongation in the range of 200 to 1000%.

In use, the invention provides a ground barrier system which prevents animals such as dogs from digging. The ground barrier system is formed by a layer of plastic polymer mesh positioned in covering relationship with the area of earth in which it is desired to prevent animals from digging and a plurality of fasteners attaching the plastic polymer mesh to such area of earth. Where the mesh is laid out on the surface of the earth, it can be subsequently buried for concealment, or vegetation can simply be permitted to grow through the mesh to provide concealment and aesthetics. The area carrying the mesh can be seeded to facilitate the concealment process if desired.

While certain preferred embodiments of the invention have been described herein, the invention is not to be construed as being so limited, except to the extent that such limitations are found in the claims.

What is claimed is:

1. A kit which can be installed in or on the earth to prevent animals from digging, said kit comprising a roll of plastic polymer mesh and a plurality of plastic fasteners for attaching the plastic polymer mesh flat against the earth, wherein the plastic polymer is selected from the group consisting of polyethylene, polyethylene+higher alpha-olefin copolymer, polypropylene and polyvinylchloride, wherein the mesh has a mesh size in the range of about 2 inches to about 4 inches and the fasteners are in the form of stakes having a length in the range of from about 5 inches to about 15 inches, and wherein each stake has a lower end which is pointed for penetrating the earth and an upper end for catching a strand of the mesh.

2. A kit as in claim 1 wherein the plastic polymer further comprises a UV stabilizer and a coloring agent selected from the group consisting of green coloring agent, black coloring agent, and brown coloring agent.

3. A kit as in claim 2 wherein the plastic polymer has a yield strength in the range of 1000 to 5000 psi and an elongation in the range of 200 to 1000%.

4. A kit as in claim 3 wherein the mesh has a weight in the range of 1/20th to 1/5 pound per square foot.

5. A ground barrier system to prevent animals from digging, said ground barrier system comprising a layer of plastic polymer mesh positioned in covering relationship with an area of earth in which it is desired to prevent animals from digging; and a plurality of fasteners attaching the plastic polymer mesh to such area of earth, wherein the layer of plastic polymer mesh is covered with a thin layer of earth which is in the range of 1 inch to 10 inches thick.

6. A ground barrier system to prevent animals from digging under a fence, said ground barrier system comprising a layer of plastic polymer mesh positioned in covering relationship with an area of earth positioned alongside the fence, with an edge of the plastic polymer mesh being fastened to the fence, and the layer of plastic polymer mesh being fastened the earth by a plurality of fasteners.

7. A ground barrier system as in claim 6 wherein the layer of plastic polymer mesh is further covered with a thin layer of earth which is in the range of 1 inch to 10 inches thick.

* * * * *